United States Patent [19]

Anderson

[11] Patent Number: 4,543,471

[45] Date of Patent: Sep. 24, 1985

[54] CONTROLLED TEMPERATURE FOOD CARRIER

[75] Inventor: John W. Anderson, Framingham, Mass.

[73] Assignee: Temp Tech, Inc., Springfield, Mass.

[21] Appl. No.: 497,753

[22] Filed: May 25, 1983

[51] Int. Cl.$^4$ .................. A21B 1/52; F27D 11/00; H05B 3/06

[52] U.S. Cl. .................. 219/387; 219/386; 219/521

[58] Field of Search ............ 219/385, 386, 387, 521, 219/403, 436, 438, 400; 165/137

[56] References Cited

U.S. PATENT DOCUMENTS

| | | | |
|---|---|---|---|
| 1,661,464 | 3/1928 | Campbell | 219/403 |
| 1,766,525 | 6/1930 | Maffoni | 219/385 |
| 1,934,446 | 11/1933 | Randolph | 219/403 |
| 2,251,582 | 8/1941 | White | 219/386 |
| 2,543,524 | 2/1951 | De Oliveira | 219/387 |
| 2,576,874 | 11/1951 | Acton | 219/387 |
| 2,577,870 | 12/1951 | Aston | 219/387 |
| 2,658,986 | 11/1953 | Gronlund | 219/387 |
| 2,675,457 | 4/1954 | Privett | 219/387 |
| 2,919,339 | 12/1959 | Hilliker | 219/400 |
| 3,074,394 | 1/1963 | Witt | 219/386 |
| 3,129,317 | 4/1964 | Howard | 219/387 |
| 3,549,861 | 12/1970 | Trachtenberg | 219/387 |
| 3,714,394 | 1/1973 | Evans | 219/386 |
| 3,760,155 | 9/1973 | Polansky | 219/386 |
| 3,808,401 | 4/1974 | Wright | 219/387 |
| 4,037,081 | 7/1977 | Aldridge | 219/387 |
| 4,198,559 | 4/1980 | Walter | 219/387 |
| 4,206,343 | 6/1980 | Mousel | 219/387 |
| 4,420,678 | 12/1983 | Kalb | 219/387 |

FOREIGN PATENT DOCUMENTS 660759 11/1951 United Kingdom ............... 219/387

Primary Examiner—Roy N. Envall, Jr.
Assistant Examiner—Teresa J. Walberg
Attorney, Agent, or Firm—Fishman & Dionne

[57] ABSTRACT

A portable controlled temperature food carrier is presented wherein independent heating and cooling temperature control units are freely interchangeable depending upon desired use. The individual temperature control units are easily removable from the carrier housing to facilitate replacement, cleaning and/or changeover from a heating to a cooling mode.

6 Claims, 3 Drawing Figures

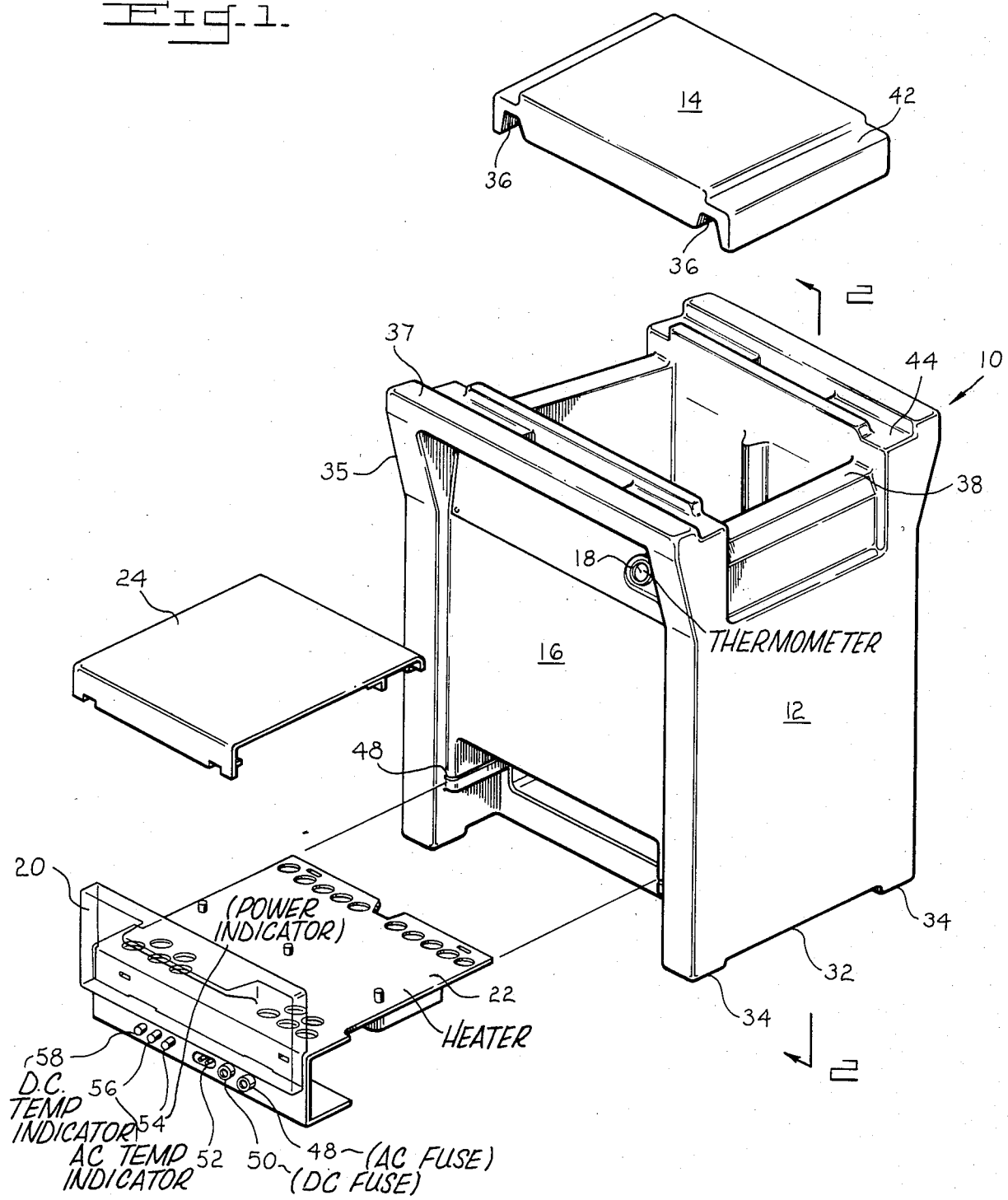

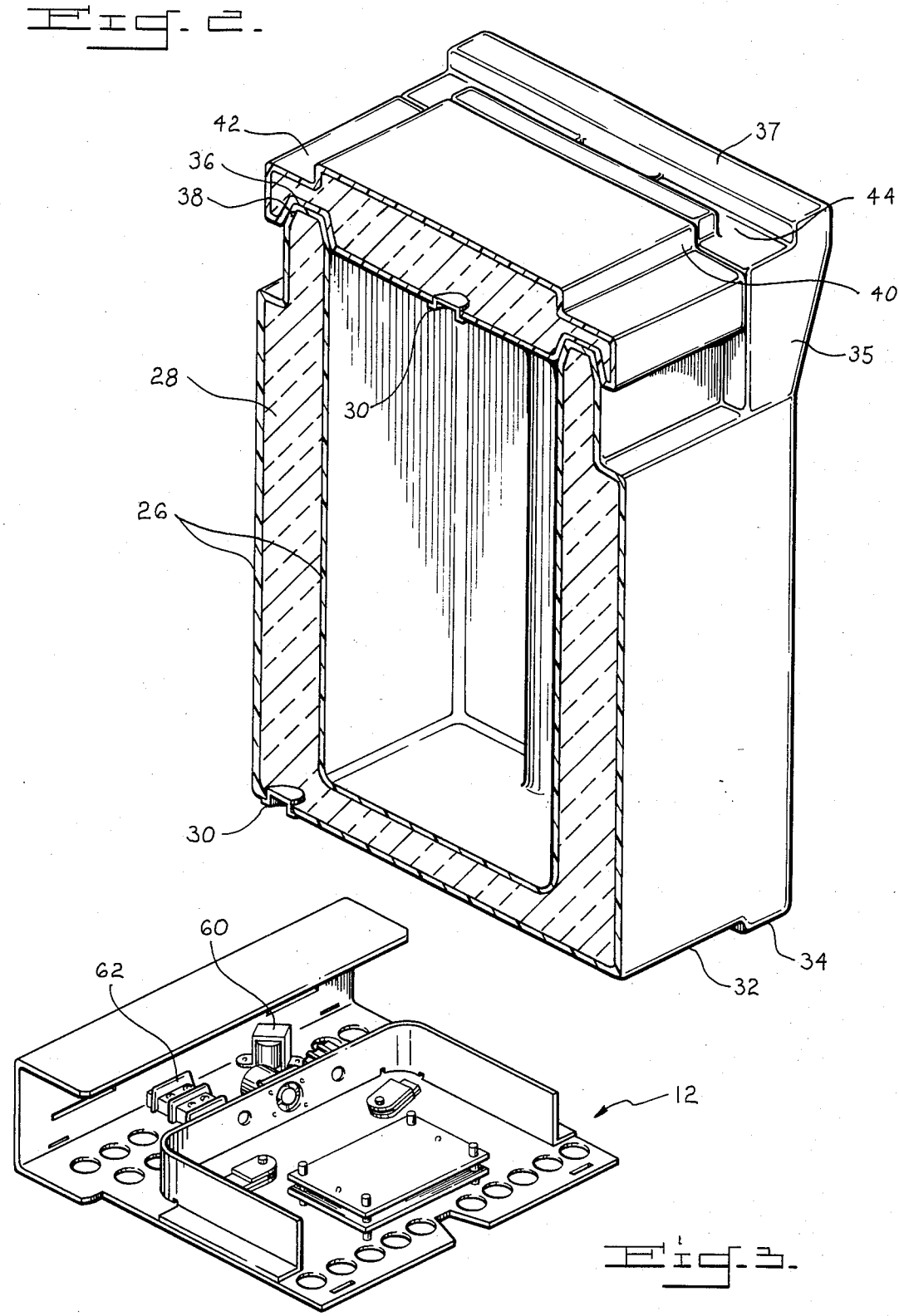

CONTROLLED TEMPERATURE FOOD CARRIER

BACKGROUND OF THE INVENTION

This invention relates to temperature controlled portable food carriers. More particularly, this invention relates to a new and improved controlled temperature food carrier wherein independent hot and cold control units may be freely interchanged depending upon desired use.

Portable carriers suitable for holding food at selected temperatures for extended periods of time find application in a wide variety of uses. Hot meal transportation to the elderly, fast food home delivery and individual usage for picnics and outing are just a few of the many useful and necessary applications. With social service home meal delivery programs on the rise, convenient and efficient meal or food carriers have taken on increasing importance. Similarly, while adequate containers or carriers for hot meal transportation have concerned those in the food delivery industry, the transportation of cold food has also become important.

Problems of economy and efficiency have arisen, however, in that one interested in meal transportation must purchase portable food carriers for heating purposes along with different carriers for keeping food cold. This necessitates the expensive acquisition and maintenance of many different food carriers. A further disadvantage of the prior art food carriers is that when the heating or cooling unit malfunctions, then the entire carrier must be discarded due to the fact that the temperature control units are integrated within the carrier.

Typical prior art food-carrying devices of the type hereinabove discussed are disclosed in U.S. Pat. Nos. 3,129,317; 3,387,114; 3,521,030; 3,714,394; 3,760,155 and 4,039 776. All of these prior art temperature-controlled food carriers exhibit the problems already mentioned.

Accordingly, it is a principal object of the present invention to provide a controlled temperature food carrier which overcomes the deficiencies of the prior art.

It is another object of the present invention to provide a temperature controlled food carrier which can be interchangeably used for either heating food or cooling food.

It is still another object of the present invention to provide a controlled temperature food carrier wherein the heating and cooling control units may be easily disengagable and interchangeable to allow the same carrier to be used as either a food warmer or food cooler.

It is yet another object of the present invention to provide a controlled temperature food carrier wherein the heating and cooling control units can be easily removed in order to economically facilitate replacement of a temperature control unit without having to discard the entire food or meal carrier.

DESCRIPTIONS OF THE DRAWINGS

These and other objects will become more apparent from the following detailed description taken in connection with the accompanying drawings wherein:

FIG. 1 is a partially exploded perspective view of the controlled temperature food carrier of the present invention;

FIG. 2 is a sectional perspective view along line 2—2 of the food carrier of FIG. 1;

FIG. 3 is a perspective view of a removable heating unit from the food carrier of FIG. 1.

DESCRIPTION OF THE PREFERRED EMBODIMENT

Referring to FIG. 1, the portable temperature controlled food carrier of the present invention is illustrated generally at 10. The carrier 10 includes a housing 12, a front wall, a rear wall, sidewalls, a bottom and an open top. As shown, the top is provided with a removable lid 14 while the front wall 16 of the housing 12 is provided with a thermometer 18 for internal temperature observation, a door 20 for removal of hot or cold meals and the hot or cold temperature control unit 22 and unit cover 24.

Referring to FIG. 2, a sectional illustration reveals that the housing 12 is constructed of a double wall hollow casing 26 with insulating material 28 completely filling the interior. In a preferred embodiment, the casing 26 is about 0.125 inches thick and may be injection-molded from a glass reinforced polypropylene. Any other suitable thickness, material or method of manufacture for the casing 26 would, of course, be obvious to one skilled in the art. The insulation material 28 may be constructed of any suitable material such as a foamed polymer or a fibrous glass. The insulation may be injected into the hollow casing through the fill ports 30 with the fill ports thereafter being appropriately capped. The housing 12 may be constructed as a one, two or more piece structure with any convenient means for attaching the individual sections of the housing 12 such as adhesive, screws or the like.

Referring jointly to FIGS. 1 and 2, the housing 12 has bottom recessed portions 32 which create four feet 34 to provide support to the carrier 10. Further support may be provided by a seat belt (not shown) which attaches to the back side of the housing 12 and is especially useful to stabilize the carrier 10 while in a moving vehicle. The carrier housing 12 has a slant 35 which provides an overhanging ledge 37. This ledge 37 is aptly suitable for gripping and lifting the food carrier 10 in and out of vehicles. Because of the light weight plastic construction, the overall weight of the food carrier 10 should be minimal (i.e., 10 to 20 pounds) which further adds to its portability. In a preferred embodiment, the food carrier 10 of the present invention should be large enough to hold at least twenty meals which may be stacked within the housing 12 in individual meal containers (not shown). The exterior of the housing 12 may have an aesthetically pleasing texture which also increases structural support and durability. The inside housing surface is preferably smooth in order to facilitate cleaning and stacking.

The lid 14 is of a similar hollow construction with insulating material injected therein as previously shown in the housing 12. The lid 14 has two identical channels 36 running along the underside of its two ends. These channels 36 engage and cooperate with two respective shoulders 38 located on the top edges of the housing 12 to form a secure, insulating fit. The lid 14 has two steps 40 along its opposite top edges which form a recessed portion 42. This recessed portion 42 aligns with a similar recessed area 44 on the housing 12. Together, these adjoining recesses allow a plurality of food carriers to be stacked one on top of the other by the feet 34 forming a snug fit in the recesses. Finally, a depression 46 located on the housing 12 directly beneath the recessed portion 42 of the lid 14 provides space to quickly and easily disengage the lid 14 from the housing 12 for initial insertion of food.

Referring now to FIGS. 1 and 3, a temperature control unit means 22, which, in this instance is a unit with heating elements thereon, is shown. The heating unit 22 is slidably engagable with the housing 12 by cooperation with parallel grooves 48. The heating unit 22 may be powered by either alternating or direct current. A control panel on the front face of the heating unit 22 includes an AC fuse 48, DC fuse 50, power supply plug 52, power indicator 54, AC temperature indicator 56 and DC temperature indicator 58. The plug 52 has two alternative cords and connectors (not shown), an AC cord capable of connecting with a 120 volt household alternating current and a 12 volt direct current plug to match an automobile cigarette lighter. When a DC plug is used, the heating unit 12 will be powered from the car or truck 12-volt battery. The food carrier 10 should preferably maintain a constant inside temperature at a minimum of 145° F. The heating unit 12, therefore, contains an internal thermostat which activates the power supply as the inside temperature cools down. When the heating unit is actually producing heat, either the AC or DC temperature indicator 56,58 (depending on the power supply) relates that information to the user.

In FIG. 3, the heating unit 12 is shown. Electrical components identified as 60 operate the unit 12 when powered by a DC power source while the electrical components at 62 operate on AC power. A heating unit cover 24 shown in FIG. 1 protects the electrical components and acts as a base for food containers inserted into the food carrier 10.

A door 20, preferably of transparent plastic, attaches to the heating unit 12. This lower door allows the carrier 10 to be loaded from the top and emptied individually from the bottom thereby minimizing heat loss. The door 20 may be attached by any suitable means such as hinges or screws.

It should be understood that while a heating temperature control unit 22 has been shown and described, a cooling control unit of the same dimensions having cooling elements located thereon can be similarly employed. The food carrier of the present invention, therefore, provides interchangeable heating or cooling elements which can be slidably fit into a housing depending on the desired use. Thus, unlike the prior art, the present invention allows the same food carrier to be used in providing electrical heating or cooling for transportation of meals.

Other advantages of the removable temperature control units of the food carrier of the present invention are that defective units may be simply discarded and replaced without acquiring an entirely new housing 12 and lid 14, due to the fact that the units are not integrated into the side walls of the housing as in many prior art devices. Further, the easy removability of the temperature control units allows for simple cleaning of the heating or cooling elements, as well as immersability of the housing into water without fear of adverse effects on the electrical components.

It will be appreciated that the removable and interchangable characteristics of the temperature control units of the present invention provide an economical and efficient means of portably transporting food or meals.

While preferred embodiments have been shown and described, various modifications and substitutions may be made thereto without departing from the spirit and scope of the invention. Accordingly, it is to be understood that the present invention has been described by way of illustrations and not limitations.

Having thus described the invention, what is claimed is:

1. A controlled temperature food carrier for carrying a plurality of meals comprising a walled housing having a bottom and an open top, a removable lid for opening and closing said top, said housing having a front wall, a portion of said front wall of said housing having an opening therein adjacent the bottom of said housing, said opening being sized to preclude simultaneous removal of all of said meals thereby limiting heat loss from within said housing, temperature control means removably disposed in said housing through said opening in said front wall, and a movable door disposed on said front wall for opening and closing said opening therein for the removal of meals from said housing.

2. The food carrier of claim 1 wherein said housing and said lid are of double-wall construction each of said double walls having a space therebetween, and wherein said space between said double walls is filled with insulating material.

3. The food carrier of claim 1 wherein said temperature control means is electrically powered by AC current.

4. The food carrier of claim 1 wherein said temperature control means is electrically powered by DC current.

5. The food carrier of claim 1 wherein means is provided for measuring the temperature inside of said housing.

6. The food carrier of claim 5 wherein said temperature measuring means provides visual indication of said inside temperature on the outside of said housing.

* * * * *